United States Patent [19]

Rim et al.

[11] 4,324,870
[45] Apr. 13, 1982

[54] SCORCH-SAFE ACCELERATION OF URETHANE VULCANIZATION OF UNSATURATED RUBBERS

[75] Inventors: Yong S. Rim, Woodbridge; Walter Nudenberg, Newton; Arnold N. Johnson, Southbury all of Conn.

[73] Assignee: Uniroyal, Inc., New York, N.Y.

[21] Appl. No.: 161,950

[22] Filed: Jun. 23, 1980

[51] Int. Cl.³ .............................. C08F 8/34; C08F 8/40
[52] U.S. Cl. ...................................... 525/127; 525/341
[58] Field of Search ................................ 525/341, 127

[56] References Cited

U.S. PATENT DOCUMENTS

| | | |
|---|---|---|
| 3,400,106 | 9/1968 | Morita .................................. 525/341 |
| 3,419,521 | 12/1968 | Scott et al. ........................... 525/341 |
| 3,426,003 | 2/1969 | Leibu .................................... 525/341 |
| 3,494,900 | 2/1970 | Morita et al. ......................... 525/341 |
| 3,496,152 | 2/1970 | Morita et al. ......................... 525/341 |
| 3,544,531 | 12/1970 | Morita et al. ......................... 525/341 |
| 3,554,857 | 1/1971 | Barton .................................. 525/341 |
| 3,627,712 | 12/1971 | Leibu ...................................... 52/341 |
| 3,629,210 | 12/1971 | Apotheker et al. .................. 525/341 |
| 3,635,920 | 1/1972 | Apotheker et al. .................. 525/341 |
| 3,645,980 | 2/1972 | Baker et al. .......................... 525/341 |
| 3,697,433 | 10/1972 | Schubant et al. .................... 525/341 |
| 3,778,419 | 12/1973 | Schubant et al. .................... 525/341 |
| 3,865,781 | 2/1975 | Loho et al. ........................... 525/341 |
| 3,867,358 | 2/1975 | Trivette et al. ...................... 525/341 |
| 3,969,349 | 7/1976 | Trivette et al. ...................... 525/341 |
| 4,065,443 | 12/1977 | Campbell et al. .................... 525/341 |
| 4,087,440 | 5/1978 | Lawrence ............................. 525/341 |
| 4,216,126 | 8/1980 | Kay ....................................... 525/341 |

FOREIGN PATENT DOCUMENTS 1942973  8/1969  Fed. Rep. of Germany ...... 525/341

Primary Examiner—William F. Hamrock
Attorney, Agent, or Firm—James J. Long

[57] ABSTRACT

Improvements in scorch time of natural and synthetic rubber compositions in urethane crosslinking systems employing alkyl derivatives of dithiophosphoric acid as the scorch delay cure catalyst having the formula:

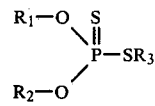

wherein $R_1$ and $R_2$ are alkyl having at least 12 carbon atoms, or connected together and forman alkylene group having at least 2 carbon atoms, and $R_3$ is hydrogen or phenethyl.

8 Claims, No Drawings

SCORCH-SAFE ACCELERATION OF URETHANE VULCANIZATION OF UNSATURATED RUBBERS

This invention relates to improvements in scorch time of natural and synthetic rubber compositions in urethane crosslinking systems by employing certain derivatives of dithiophosphoric acid as scorch delay cure catalysts. Optionally, a small amount of sulfur may be added to the compositions.

U.S. Pat. No. 3,645,980, Baker et al, Feb. 29, 1972, discloses a novel method of crosslinking natural or synthetic rubbers which comprises reacting rubber with a nitrosophenol or nitrosoamine and reacting pendant amino or hydroxyl groups in the resulting product with a di- or poly-isocyanate, so as to crosslink the rubber. The crosslinking efficiency of the system is significantly improved by the addition of certain metal salts of thiols. Examples of such salts include zinc, cadmium and tin dithiocarbamates, dithiophosphates and mercaptobenzothiazoles.

C.A. 88, 24059n (1978) discloses scorch improvements in urethane crosslinking systems using mercaptosilanes. Specifically mentioned is 3-(trimethoxysilyl)-1-propanethiol.

C.A. 86, 191,076N (1977) discloses the use of Novor (trademark) 924 (a nitrosophenol blocked diisocyanate) urethane vulcanizing agent in combination with zinc dimethyldithiocarbamate or tetramethylthiuram monosulfide.

In one aspect, the instant invention is directed to a method of curing an unsaturated rubber which is a conjugated diene homopolymer or a copolymer containing at least 50% by weight of a conjugated diene by heating the rubber in admixture with the adduct of nitrosophenol and methylene bis(4-phenylisocyanate) of the formula

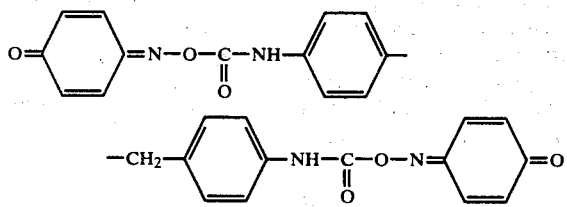

to form urethane cross-links, embodying the improvement comprising adding to the rubber, prior to curing, as a scorch delay cure catalyst, a derivative of dithiophosphoric acid of the formula

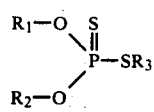

wherein $R_1$ and $R_2$ are alkyl groups having at least 12 carbon atoms (usually 12 to 40 carbon atoms), or $R_1$ and $R_2$ may be connected together and form an alkylene group having at least 2 carbon atoms (usually 3 to 12 carbon atoms) and $R_3$ is hydrogen or phenethyl (either alpha- or beta-phenethyl).

It is well known that sulfur compounds have been used in the vulcanization of rubber for many years and that such systems have reached a high degree of development. Although sulfur-cured rubbers are economical to produce they are less than desirably resistant to cure reversion and oxidative and thermal degradation. Over the years several non-sulfur vulcanizing systems have been developed. Among these may be mentioned the use of mono-maleimides and bis-maleimides as vulcanizing agents. More recently, another non-sulfur vulcanization system, which involves the use of urethane crosslinkers, has been disclosed by Baker et. al., in "New Reactions for the Vulcanization of Natural Rubber" published in Rubber Chemistry & Technology, Volume 43, No. 3, May 1970. Basically, such urethane crosslinking systems involve treating natural rubber or the synthetic highly unsaturated polymers with nitrosophenols or nitrosoanilines to react the nitroso groups with the rubber molecule, thus providing pendant hydroxyl or amino groups, which are then reacted with diisocyanates to obtain the desired cross-linking.

The above mentioned non-sulfur vulcanization systems do exhibit some advantages when compared with sulfur vulcanization systems. However, they are relatively more expensive. It has been found that the urethane cured compositions exhibit good tensile properties, good resistance to air aging and to reversion with desirable scorch times. One of the major drawbacks to a urethane cure as practiced in the prior art is its short scorch time, which causes difficult control problems. As pointed out above, several additives have been incorporated into rubber compositions with some success. Surprisingly, we have now found that a certain class of derivatives of dithiophosphoric acid having the formula stated above, will improve scorch safety considerably. Optionally, a small amount of sulfur is added to enhance the cure rate and the modulus. Specific examples include: cyclic 0,0-2,2-dimethyltrimethylene-S-alpha-phenethylphosphorodithioate which has the formula

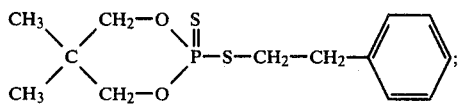

0,0-2,2-dimethyltrimethylene-S-hydrogen phosphorodithioate; O,O-bis(dodecyl)-S-hydrogen-phosphorodithioate; O,O-bis(tetradecyl)-S-hydrogen-phosphorodithioate; and O,O-ditricosyl-S-hydrogen-phosphorodithioate containing $C_{18}$–$C_{34}$ mixed alkyl thiophosphono disulfides. Generally, we add from 1 to 5 parts of the alkyl derivative of dithiophosphoric acid, preferably from 2 to 4 parts per 100 parts of rubbery polymer.

Urethane crosslinkers which are suitable for carrying out the invention are commercially available, as represented by Novor 920 and 924 (trademarks; Hughson Chemicals Co). These contain nitrosophenol blocked diisocyanates and are employed in amounts ranging from 2 to 10 parts, preferably from 4 to 7 parts per 100 parts of the rubber polymer. Typical curative is represented by the adduct of nitrosophenol and methylene bis(4-phenylisocyanate) of the formula given previously.

The polymers which are operable in the present invention comprise natural and synthetic rubbers. Synthetic rubbers include homopolymers of conjugated diolefin hydrocarbons and copolymers of such diolefins with mono-olefinic compounds copolymerizable therewith.

Such mono-olefins include styrene, alpha-methylstyrene, p-methylstyrene, alpha,p-dimethylstyrene, acrylic and methacrylic nitriles, amides, acids and esters, vinylpyridines, fumeric esters, methylenemalonic esters, vinylidene chloride, methyl vinyl ketone and methyl isopropenyl ketone. Mixtures of such monoolefinic compounds can also be polymerized with the diolefin. Of particular usefulness as the elastomeric component are the butadiene-styrene copolymers and block copolymers of butadiene or isoprene with styrene of the S-B-S and S-I-S types and butadiene-acrylonitrile copolymers.

In a styrene-butadiene copolymer rubber, the copolymer typically contains 21 to 45% of the copolymerized styrene.

In a styrene-butadiene or styrene-isoprene block copolymer rubber, the copolymer frequently contains 10 to 40% of the copolymerized styrene.

In the case of a nitrile rubber, the copolymer ordinarily contains 2 to 50% by weight of the copolymerized acrylonitrile (preferably 20 to 40% by weight) the balance comprising 1,3-butadiene.

It is also within the scope of the invention to blend natural rubber with the highly unsaturated synthetic rubbers as well as to blend highly unsaturated rubber, e.g., natural rubber, with a low unsaturation polymer, e.g., ethylene-propylene-non-conjugated diene rubber, such as ethylene-propylene-ethylidene norbornene terpolymer having an iodine number of 20 or less. If a low unsaturation polymer is used, the amount thereof is typically from 10 to 40 parts, per 100 parts by weight of the highly unsaturated rubber.

When sulfur is added to the rubber compositions to enhance the cure rate and the modulus we employ from 0.2 to 1.75 parts, preferably from 0.3 to 0.9 parts per 100 parts of the rubbery polymer.

The composition is vulcanized by subjecting it to conventional vulcanization conditions, that is, by heating it at vulcanizing temperature for a time sufficient to effect the desired degree of cure. Usually the article being vulcanized is exposed to a temperature of from 100° C. or less to 250° C. or more in a press or in an oven for from 1 minute or less to 2 hours or more, the time and temperature typically being inversely related. The particular time and temperature of cure most suitable in any given case depends of course on such variables as the size and shape of the article, the character of the heating device, the degree of cure desired, etc.

The practice of the invention makes it possible to enjoy the advantages of the urethane (isocyanate) cross-linking, such as excellent heat reversion resistance with good fatigue properties, while at the same time avoiding the scorch (premature vulcanization) problems encountered with prior practices.

The following examples will serve to illustrate the improved scorch safety of rubber compositions employing an isocyanate cure with derivatives of dithiophosphoric acid as the catalysts.

The identification of the materials used in the examples follow:

SMR-5CV—Standard Malaysian Rubber—grade 5CV.

N-330 Black—High Abrasion Furnace Black.

Kadox (trademark)—zinc oxide.

Reogen (trademark)—sulfonic acid and paraffin oil blend marketed by R.T. Vanderbilt Co., density 0.83–0.86 mg/m$^3$.

Naugard Q (trademark)—polymerized 1,2-dihydro-2,2,4-trimethylquinoline, manufactured by Uniroyal, Inc.; specific gravity 1.06.

CaO—calcium oxide.

A.O. ZMB—The zinc salt of 2-mercaptobenzimidazole.

Flexzone 7L (trademark)—N-Phenyl-N′(1,3-dimethyl butyl)-p-phenylene diamine.

Methazate (trademark)—zinc dimethyldithiocarbamate.

Novar 924 (trademark)—curative; adduct of nitrosophenol and methylene bis (4-phenylisocyanate).

Catalyst 1—O,O-2,2-dimethyltrimethylene-S-hydrogen phosphorodithioate.

Catalyst 2—mixture of O,O-bis(dodecyl)-S-hydrogen phosphorodithioate (25%) and O,O-bis(tetradecyl)-S-hydrogen phosphorodithioate (75%).

Catalyst 3—O,O-ditricosyl-S-hydrogen phosphorodithioates containing $C_{18}$–$C_{34}$ mixed alkyl thiophosphono disulfides.

Catalyst 4—cyclic O,O-2,2-dimethyltrimethylene-S-alpha-phenethylphosphorodithioate.

SBR 1500—styrene-butadiene copolymer rubber containing 21% by weight of copolymerized styrene.

EPDM—ethylene-propylene-5-ethylidene-2-norbornene terpolymer rubber, iodine number 8.

Sundex 790 (trademark)—an aromatic extender oil manufactured by Sun Oil Co.

Delac NS (trademark)—accelerator; t-butyl benzothiazole sulfenamide manufactured by Uniroyal, Inc.

Comparison Example

This example is not part of the present invention but serves to illustrate the state of the art of the isocyanate cure with and without an additive such as Methazate, to improve scorch safety. Stocks shown in Table I are mixed in a Banbury (trademark) mixer, with the exception of the catalyst and cross-linking agent, for seven minutes discharging the material at 275° F. The material is then transferred to a two-roll rubber mill at which time the catalyst and crosslinking agent are added, - the temperature of the stock not exceeding 180° F. with a total milling time of three minutes. Stock is then sheeted off and ready for curing for 30' at 320° F., with the results shown in Table I.

TABLE I

| | Stock: | | | |
|---|---|---|---|---|
| | A | B | C | D |
| Compounding Ingredients | | | | |
| SMR 5CV | 100 | 100 | 100 | 100 |
| N-300 Black | 50 | 50 | 50 | 50 |
| Kadox | 5.0 | 5.0 | 5.0 | 5.0 |
| Reogen | 2.0 | 2.0 | 2.0 | 2.0 |
| Stearic Acid | 1.0 | 1.0 | 1.0 | 1.0 |
| Naugard Q | 1.5 | 1.5 | 1.5 | 1.5 |
| CaO | — | — | 3.0 | 3.0 |
| A.O. ZMB | 2.0 | 2.0 | 2.0 | 2.0 |
| Methazate | — | 1.0 | 2.0 | 2.0 |
| Novor 924 | 6.7 | 6.7 | 6.7 | 6.7 |
| Scorch at 275° F. (Time for 3pt. rise) | 20'45" | 9'20" | 9'50" | 9'00" |
| Physical Properties of Vulcanizates-Cured 30' at 320° F. | | | | |
| Shore A Durometer | 57 | 57 | 62 | 62 |
| Modulus at 100% Elongation | 70 | 160 | 270 | 300 |
| Modulus at 200% Elongation | 180 | 570 | 930 | 1100 |
| Modulus at 300% Elongation | 830 | 1170 | 1830 | 2150 |
| Tensile Strength | 1390 | 1830 | 3190 | 3150 |
| % Elongation at Break | 400 | 410 | 450 | 380 |

This comparison example clearly shows that an isocyanate cure has good scorch safety (Stock A). However, the rate of modulus increase and development of tensile strength properties are impractically slow. On the other hand, when 1.0 and 2.0 parts of Methazate are added to a natural rubber-isocyanate cured composition scorch safety is significantly reduced.

EXAMPLE I

This example demonstrates the use of an alkyl derivative of dithiophosphoric acid as a catalyst for nitrosophenol/isocyanate curing of natural rubber compositions compared with the use of Methazate for improving scorch safety. The compositions shown in Table II were compounded and mixed according to the procedure disclosed in the above comparison example. Stock E is outside the invention; stock F represents the practice of the invention.

TABLE II

| | Stock: | |
|---|---|---|
| | E | F |
| Compounding Ingredients | | |
| SMR5CV | 100 | 100 |
| N-330 Black | 50 | 50 |
| Kadox | 5.0 | 5.0 |
| Reogen | 2.0 | 2.0 |
| Stearic Acid | 1.0 | 1.0 |
| Naugard Q | 1.5 | 1.5 |
| A.O. ZMB | 1.0 | 2.0 |
| CaO | 3.0 | 3.0 |
| Novor 924 | 6.7 | 6.7 |
| Methazate | 2.0 | — |
| Catalyst 1 | — | 2.0 |
| Scorch at 275° F. (Time for 3 pt. rise) | 8'12" | 17'0" |
| Physical Properties of Vulcanizates-Cured 30' at 320° F. | | |
| Shore A Durometer | 66 | 63 |
| Modulus at 100% Elongation | 300 | 180 |
| Modulus at 200% Elongation | 910 | 600 |
| Modulus at 300% Elongation | 1970 | 1220 |
| Tensile Strength | 3300 | 2080 |
| % Elongation at Break | 440 | 400 |

The above data show that an isocyanate cured natural rubber composition containing an alkyl derivative of dithiophosphoric acid show about a two-fold increase in scorch safety when compared with a similar composition containing Methazate as the catalyst. However, the rate of modulus increase of the former is somewhat slower, but still quite satisfactory for use in a number of industrial applications.

EXAMPLE II

This example is similar to Example I above except that a small amount of sulfur was added to the catalyst of the invention. The compositions shown in Table III were compounded and mixed according to the procedure disclosed in the above comparison example. Stock G is outside the invention; Stock H represents the invention.

TABLE III

| | Stock: | |
|---|---|---|
| | G | H |
| Compounding Ingredients | | |
| SMR-5CV | 100 | 100 |
| N-330 Black | 50 | 50 |
| Kadox | 5.0 | 5.0 |
| Reogen | 2.0 | 2.0 |
| Stearic Acid | 1.0 | 1.0 |
| Naugard Q | 1.5 | 1.5 |
| Novor 924 | 7.0 | 7.0 |
| Methazate | 2.0 | — |
| Catalyst 1 | — | 2.0 |
| A.O. ZMB | .10 | 1.0 |
| Flexzone 7L | 0.5 | 0.5 |
| Sulfur | — | 0.3 |
| Scorch at 275° F. (Time for 3pt. rise) | 10'00" | 14'50" |
| Physical Properties of Vulcanizates-Cured 30' at 320° F. Measured at R.T. | | |
| Shore A Durometer | 70 | 72 |
| Modulus at 100% Elongation | 330 | 400 |
| Modulus at 200% Elongation | 930 | 1220 |
| Modulus at 300% Elongation | 1960 | 2030 |
| Tensile Strength | 3390 | 3220 |
| % Elongation at Break | 470 | 440 |
| Physical Properties of Vulcanizates-Cured 30' at 320° F. Measured at 250° F. | | |
| Modulus at 100% Elongation | 218 | 245 |
| Modulus at 200% Elongation | 427 | 568 |
| Modulus at 300% Elongation | 802 | 1069 |
| Tensile Strength | 2034 | 1910 |
| % Elongation at Break | 245 | 243 |
| After Aging in Air for 14 Days at 212° F. | | |
| Shore A Durometer | 67 | 72 |
| Modulus at 100% Elongation | 230 | 350 |
| Modulus at 200% Elongation | 1050 | 1300 |
| Tensile Strength | 1820 | 1920 |
| % Elongation at Break | 370 | 310 |
| Compression Set (Method B) ASTM D395-69 | 24.6 | 24.2 |
| Goodrich Flexometer (ASTM D623-67) | | |
| ΔT | 53 | 46 |
| Permanent Set | 5.7 | 4.1 |
| Dynamic Drift | 2.1 | 0.5 |
| Tear (ASTM 624-54) - #/in. | | |
| Room Temperature | 326 | 350 |
| 250° F. | 245 | 243 |

The data show that a small amount of sulfur added to the present catalyst system certainly enhances the rate of cure and modulus to result in properties comparable (green and aged) to those properties obtained in a Methazate catalyzed system and still obtaining about a 50% improvement in scorch safety, —an unexpected result.

EXAMPLE III

This example demonstrates the use of various alkyl derivatives of dithiophosphoric acid with small amounts of sulfur added. The compositions shown in Table IV were compounded and mixed according to the procedure disclosed in the above comparison example.

TABLE IV

| | Stock: | | | | |
|---|---|---|---|---|---|
| | J | K | L | M | N |
| Compounding Ingredients | | | | | |
| SMR-5CV | 100 | 100 | 100 | 100 | 100 |
| N-330 Black | 50 | 50 | 50 | 50 | 50 |
| Kadox | 5.0 | 5.0 | 5.0 | 5.0 | 5.0 |
| Reogen | 2.0 | 2.0 | 2.0 | 2.0 | 2.0 |
| Stearic Acid | 1.0 | 1.0 | 1.0 | 1.0 | 1.0 |
| Naugard Q | 1.5 | 1.5 | 1.5 | 1.5 | 1.5 |
| CaO | 3.0 | 3.0 | 3.0 | 3.0 | 3.0 |

TABLE IV-continued

| | Stock: | | | | |
|---|---|---|---|---|---|
| | J | K | L | M | N |
| A.O. ZMB | 1.0 | 1.0 | 1.0 | 1.0 | 1.0 |
| Novor 924 | 7.0 | 7.0 | 7.0 | 7.0 | 7.0 |
| Catalyst 1 | 2.0 | 2.0 | — | — | — |
| Catalyst 2 | — | — | 3.0 | — | — |
| Catalyst 3 | — | — | — | 4.0 | — |
| Catalyst 4 | — | — | — | — | 3.0 |
| Sulfur | 0.2 | 0.3 | 0.3 | 0.3 | 0.3 |
| Scorch at 275° F. (3 pt. rise) | 15'0" | 14"50" | 16'42" | 20'52" | 23'30" |
| Physical Properties of Vulcanizates-Cured 30' at 320° F. | | | | | |
| Shore A Durometer | 67 | 71 | 65 | 66 | 67 |
| Modulus at 100% Elongation | 380 | 450 | 420 | 430 | 220 |
| Modulus at 200% Elongation | 1210 | 1290 | 1440 | 1240 | 840 |
| Modulus at 300% Elongation | 2260 | 2390 | 2750 | 2430 | 1730 |
| Tensile Strength | 3360 | 3350 | 3660 | 3420 | 3020 |
| % Elongation at Break | 440 | 390 | 395 | 405 | 450 |
| Goodrich Flexometer (ASTM D623-67) | | | | | |
| ΔT | 52 | 43 | 40 | 42 | 57 |
| Static Deflection | 20.0 | 18.6 | 17.5 | 21.8 | 25.3 |
| Dynamic Deflection | 1.9 | 0.3 | 1.1 | 0.3 | 3.9 |
| Permanent Set | 7.7 | 4.7 | 4.6 | 4.6 | 14.1 |

The data in Table IV show that when certain alkyl derivatives of dithiophosphoric acid are substituted for Methazate (see stock E in Example I) in Novor recipes the scorch safety is significantly improved. It is also noted that the greatest scorch safety is obtained when those derivatives having the higher molecular weights are incorporated into the compositions. See stocks M and N above. These two catalysts (i.e., Catalyst 3 which is O,O-ditricosyl-S-hydrogen phosphorodithioate containing $C_{18}$-$C_{34}$ mixed alkyl thiophosphono disulfides and Catalyst 4 which is cyclic 0,0-2,2-dimethyltrimethylene-S-alpha-phenethylphosphorodithioate) are the preferred compounds. All the compositions exhibited excellent physical properties.

EXAMPLE IV

This example demonstrates the use of an alkyl derivative of dithiophosphoric acid with a small amount of sulfur in an SBR-Novor recipe and in a natural rubber-/ethylene-propylene terpolymer blend Novor recipe and compared with similar compositions in sulfur recipes. Again the compositions (shown in Table V) were compounded and mixed according to the procedure disclosed in the above comparison example.

TABLE V

| | Stock: | | | |
|---|---|---|---|---|
| | O | P | Q | R |
| Compounding Ingredients | | | | |
| SBR-1500 | 100 | 100 | — | — |
| SMR-5CV | — | — | 70 | 70 |
| EPDM | — | — | 30 | 30 |
| N-330 Black | 50 | 50 | 50 | 50 |
| Calcium Oxide | — | 3.0 | — | 3.0 |
| Sundex 790 | 5.0 | 3.0 | 3.0 | 3.0 |
| Stearic Acid | 2.0 | 1.0 | 1.0 | 1.0 |
| A.O. ZMB | 1.0 | 1.0 | 1.0 | 1.0 |
| Naugard Q | 1.0 | 1.0 | 1.0 | 1.0 |
| Delac NS | 1.0 | — | 0.6 | — |
| Novor 924 | — | 5.0 | — | 5.0 |
| Catalyst 1 | — | 2.0 | — | 2.0 |
| Kadox | 3.0 | 3.0 | 5.0 | 5.0 |

TABLE V-continued

| | Stock: | | | |
|---|---|---|---|---|
| | O | P | Q | R |
| Sulfur | 1.75 | 0.5 | 2.5 | 0.4 |
| Scorch at 275° F. (3.0 pt. rise) | 21.0' | 25.0' | 20.57' | 14.0' |
| Physical Properties of Vulcanizates cured 30' at 320° F. | | | | |
| Shore A Durometer | 65 | 66 | 65 | 66 |
| Modulus at 100% Elongation | 370 | 280 | 340 | 280 |
| Modulus at 200% Elongation | 1160 | 850 | 1040 | 680 |
| Modulus at 300% Elongation | 2270 | 1610 | 1530 | 1550 |
| Tensile Strength | 3070 | 2740 | 1970 | 1920 |
| % Elongation at Break | 390 | 445 | 415 | 410 |
| Goodrich Flexometer | | | | |
| ΔT - °F. | 52 | 80 | 122 | 82 |
| Static Deflection | 22.4 | 26.1 | 30.2 | 39.9 |
| Dynamic Drift | 0.3 | 3.9 | 24.5 | 10.8 |
| Permanent Set | 4.8 | 20.7 | 33.8 | 29.9 |
| Compression Set (Method B) | 15.5 | 32.8 | 24.8 | 39.1 |

Stocks P and R which are within the scope of the invention show improved scorch safety when compared with similar stocks employing conventional sulfur recipes. All four stocks exhibited good physical properties. However, it is noted that the rate of cure as judged by modulus increase for stock P is slightly slower when compared with stock O. Stocks Q and R show comparable cure rates.

EXAMPLE V

In this example a preformed salt (viz., zinc O,O-dibutylphosphorodithioate), is compared with the invention catalyst (viz., Catalyst 1). The compounding ingredients are the same as in Table I above from SMR 5CV through A.O. ZMB with the exception that no CaO is added. The rest of the formula is shown in Table VI, where Stock S represents the invention and Stock T is a companion using zinc O,O-dibutylphosphorodithioate ("ZDBPD"). Table VI also shows the physical properties after cure.

TABLE VI

| | Stock | |
|---|---|---|
| | S | T |
| Novor 924 | 8.1 | 8.1 |
| Catalyst 1 | 2.4 | — |
| ZDBPD | — | 2.4 |
| Physical Properties of Vulcanizates Cured 30' @ 320° F. | | |
| Shore A Durometer | 60 | 63 |
| Modulus at 100% Elongation | 180 | 250 |
| Modulus at 200% Elongation | 670 | 870 |
| Modulus at 300% Elongation | 1360 | 1770 |
| Tensile Strength | 1790 | 2590 |
| % Elongation at Break | 370 | 400 |

Results show that Stock S of the invention gives about a 50% improvement in scorch safety when compared with a similar Stock T in which a preformed salt was employed. However, it is noted that the rate of cure as judged by modulus increase for Stock S is slightly slower when compared with Stock T.

What is claimed is:
1. In a method of curing an unsaturated rubber which is a conjugated diene homopolymer or a copolymer containing at least 50% by weight of units derived from a conjugated diene by heating the rubber in admixture with an adduct of nitrosophenol and methylene bis(4-phenylisocyanate) of the formula

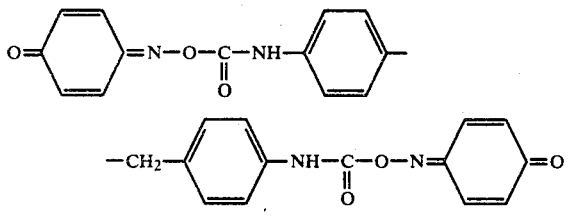

to form urethane cross-links, the improvement comprising adding to the rubber, prior to curing, as a scorch delay cure catalyst, a derivative of dithiophosphoric acid of the formula

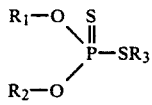

wherein $R_1$ and $R_2$ are alkyl groups having at least 12 carbon atoms or are connected together and form an alkylene group having at least 2 carbon atoms, and $R_3$ is hydrogen or phenethyl.

2. A method as in claim 1 in which the amount of derivative of dithiophosphoric acid is from 1.0 to 5 parts, and the amount of said adduct is from 2.0 to 10 parts, per 100 parts by weight of the rubber.

3. A method as in claim 1 in which the rubber contains from 0.2 to 1.75 parts of sulfur per 100 parts by weight of rubber.

4. A method as in claim 1 in which the said rubber additionally contains, in admixture therewith, up to 50 parts of a terpolymer of ethylene, propylene and a non-conjugated diene per 100 parts by weight of said rubber.

5. A method as in claim 1 in which the said catalyst is O,O-ditricosyl-S-hydrogen phosphorodithioate containing $C_{18}$–$C_{34}$ mixed alkyl thiophosphono disulfides.

6. A method as in claim 1 in which the said catalyst is cyclic O,O-2,2-dimethyltrimethylene-S-phenethyl-phosphorodithioate.

7. A method as in claim 1 in which the said catalyst is O,O-2,2-dimethyltrimethylene-S-hydrogen phosphorodithioate.

8. A method as in claim 1 in which the said catalyst is a mixture of O,O-bis(dodecyl) and (tetradecyl)-S-hydrogen phosphorodithioate.

* * * * *